United States Patent

Hanes

[15] 3,695,633
[45] Oct. 3, 1972

[54] REMOTELY CONTROLLED HYDRAULICALLY OPERATED CONNECTIBLE AND DISCONNECTIBLE FLEXIBLE JOINT

[72] Inventor: James W. E. Hanes, Ventura, Calif.

[73] Assignee: Vetco Offshore Industries, Inc., Ventura, Calif.

[22] Filed: March 19, 1970

[21] Appl. No.: 20,920

[52] U.S. Cl. ............... 285/18, 285/261, 285/315, 285/321, 285/DIG. 21
[51] Int. Cl. .............................................. F16l 35/00
[58] Field of Search .... 166/0.6; 285/18, 24, 27, 315, 285/261, 316, 321, DIG. 21

[56] References Cited

UNITED STATES PATENTS

| | | | |
|---|---|---|---|
| 2,904,357 | 9/1959 | Knox | 285/DIG. 21 |
| 3,433,504 | 3/1969 | Hanes | 285/321 X |
| 2,962,096 | 11/1960 | Knox | 285/315 X |
| 3,459,442 | 8/1969 | Yarmett et al. | 285/321 X |
| 3,450,421 | 6/1969 | Harwell | 285/315 X |
| 3,222,089 | 12/1965 | Otteman | 285/315 X |
| 3,228,715 | 1/1966 | Neilon et al. | 285/315 X |
| 3,492,027 | 1/1970 | Herring | 285/315 X |

Primary Examiner—Dave W. Arola
Attorney—Bernard Kriegel

[57] ABSTRACT

A flexible ball and socket joint for incorporation in a marine riser adapted to extend from a blowout preventer attached to an underwater wellhead to a drilling vessel. A lock ring on the socket or box of the joint engages the ball or pin of the joint to hold the joint assembled, the ring being retained in such position by a piston slidable in a cylinder. Conducting fluid under pressure into one portion of the cylinder from a remote point shifts the piston to a non-holding position, permitting the lock ring to expand and the pin and box to separate from one another. Conducting fluid under pressure to another cylinder portion shifts the piston in the opposite direction to contract the lock ring against the pin and retain the pin and box assembled. If the fluid pressure system fails, the piston is shiftable to its releasing position mechanically.

7 Claims, 5 Drawing Figures

PATENTED OCT 3 1972 3,695,633

INVENTOR.
JAMES W. E. HANES
By Bernard Kriegel
ATTORNEY.

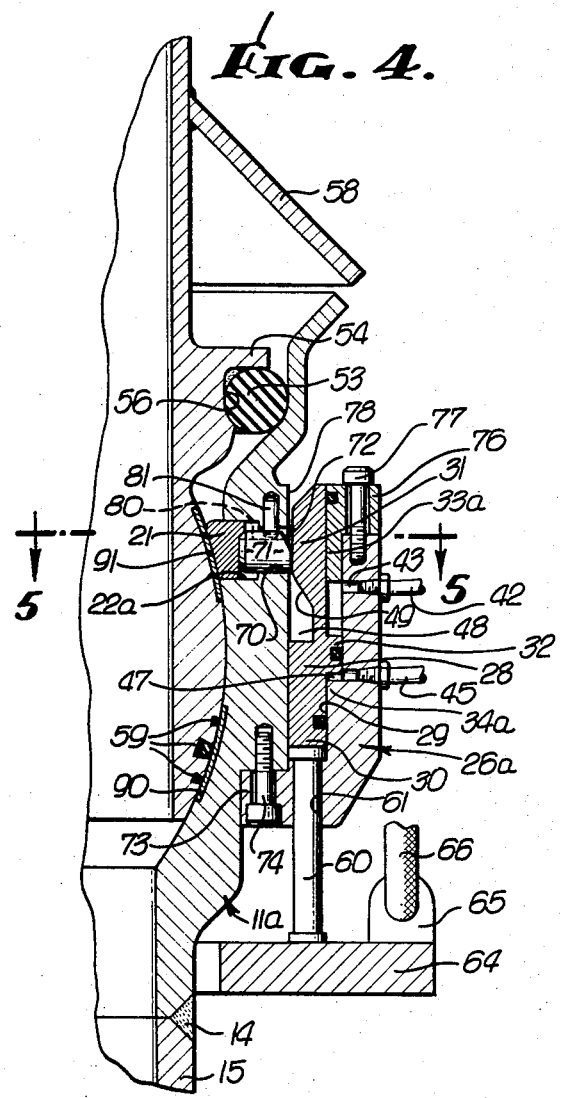
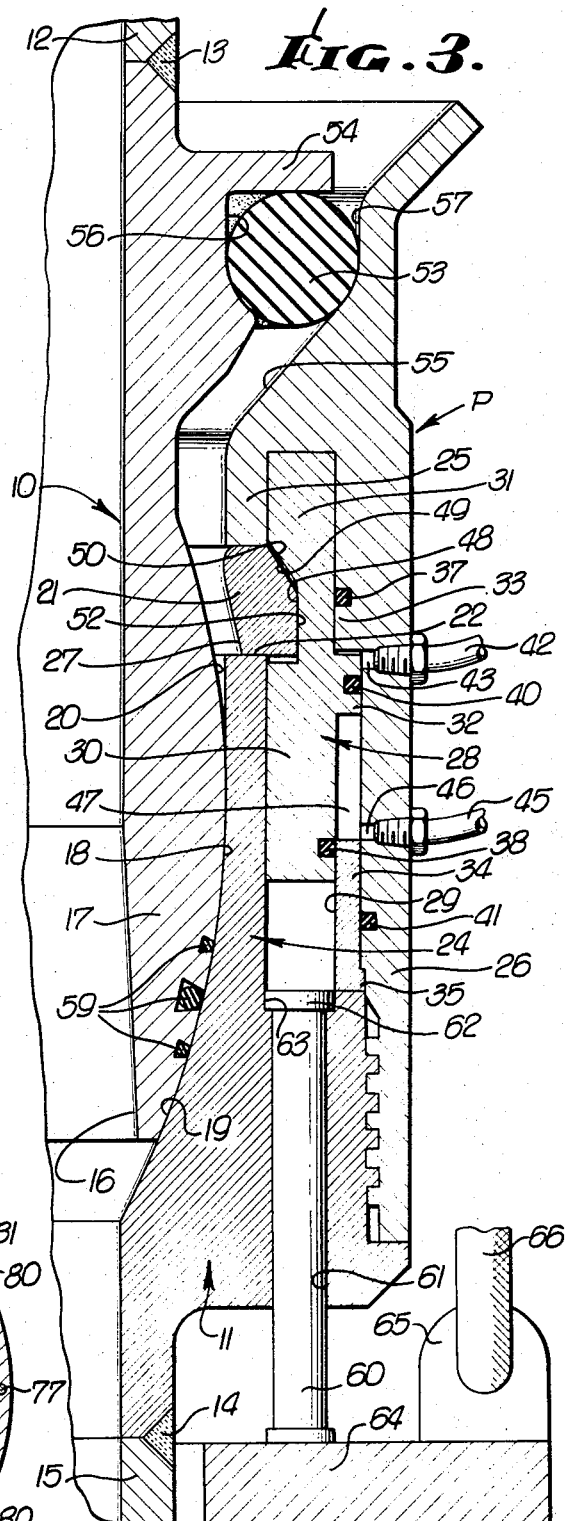

REMOTELY CONTROLLED HYDRAULICALLY OPERATED CONNECTIBLE AND DISCONNECTIBLE FLEXIBLE JOINT

The present invention relates to connectors, and more particularly to a connector adapted for use in a marine riser extending between an underwater well bore and a drilling vessel floating in the water over the location of the well bore.

In drilling a well bore below a body of water from a vessel floating therein, a marine riser extends from a blowout preventer stack attached to the wellhead to the drilling vessel. This marine riser maintains communication between the well bore and the drilling vessel, providing a guide for moving tools into and out of the well bore, and also as a conductor for the return of drilling mud and formation cuttings to the floating vessel. Since the vessel is held in position by several anchors, or other devices, the wind and current is capable or moving the vessel off location to some extent, depending on the slack in the several anchor lines. This movement is permitted to a limited degree by a flexible joint arrangement usually provided at the lower portion of the marine riser. Several types of flexible joints can be used, but the one most commonly used is of the ball and socket type, in which either a single or a multiplicity of ball and socket joints are employed.

In the event of failure of the drilling vessel positioning device, as, for example, failure of one or more anchors under storm conditions, which allows the drilling vessel to drift off position to a degree that might cause damage to the marine riser or wellhead, or both, it is desirable to remotely disconnect the marine riser from the wellhead or blowout preventer stack.

By virtue of the present invention, an improved connector is provided for attaching the marine riser to a wellhead or blow-out preventer stack which is readily disconnected, when desired, under remote control so as to prevent damage to the marine riser, wellhead, blowout preventer stack, or the like. More specifically, the flexible joint at the lower end of the marine riser is made disconnectible, and also connectible, under remote control, combining the functions of a flexible joint and a connector in a single unit, effecting substantial economies. In a more limited sense, the releasable connector has for its objective the provision of an apparatus that combines the functions of a flexible ball joint and a remote connectible and disconnectible connector, all embodied in a single unit.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 3 is a view similar to FIG. 2, with the joint parts in position for uncoupling the joint pin or ball from the joint box or spherical socket;

FIG. 4 is a view similar to FIG. 2 of a modified flexible joint embodying the invention; and FIG. 5 is a cross-section taken along the line 5—5 on FIG. 4.

Figure 1:
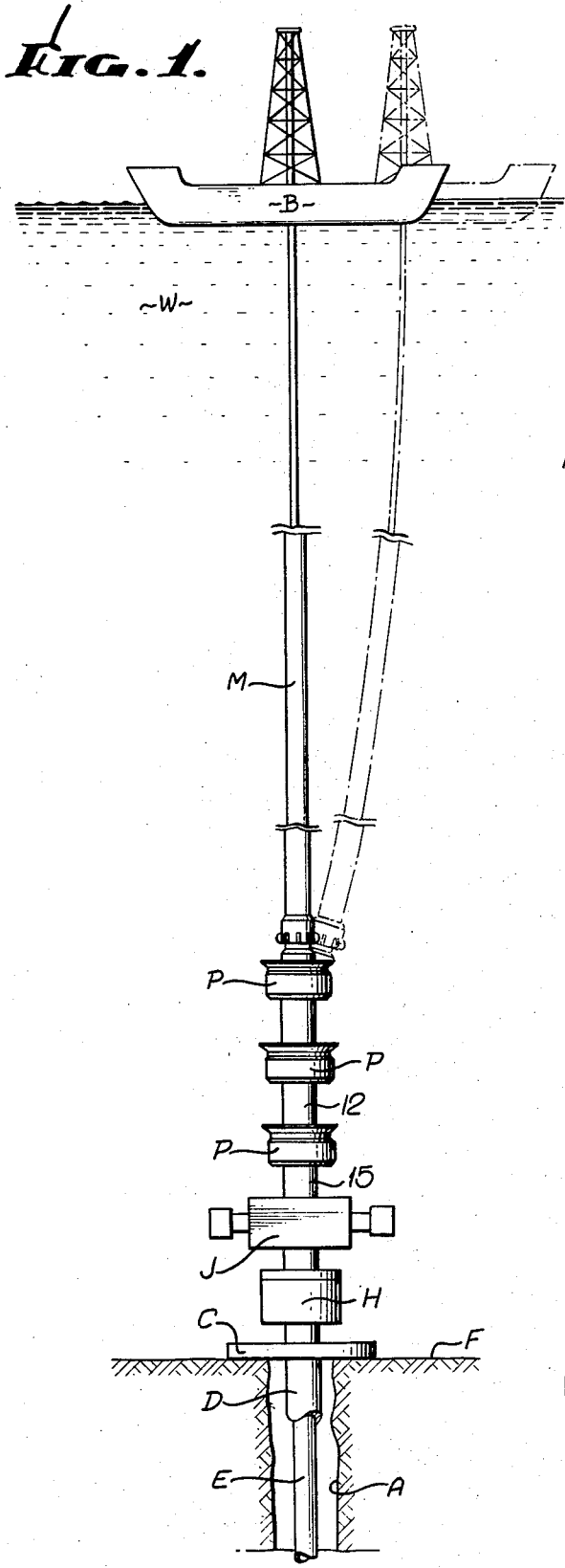
FIG. 1 is a diagrammatic view of a system for drilling a well bore from a floating drilling vessel and embodying the invention.

As shown in the drawings, an underwater well bore A extends downwardly from the floor F of a body of water W on which a drilling barge or vessel B is floating. A suitable base C rests on the ocean floor, there being a plurality of concentric casing strings D, E extending downwardly into the well bore and suitably cemented therein. One of the strings of casing D or E is connected through a connector H and one or more blowout preventers J to the lower portion of a marine riser or conductor pipe M extending upwardly to the drilling barge B, to which it is secured. The marine conductor pipe may embody a plurality of flexible connectors P to permit relative movement of the barge and portions of the conductor pipe with respect to the blowout preventers located at or adjacent to the ocean floor. As is well known, the operation of continued drilling of the well bore A is conducted from the floating drilling vessel B through the marine conductor pipe M, P and blowout preventers J therebelow and the casing in the well bore, the drilling operation taking place below the lower end of the casing E. The drilling vessel may tilt or move off its location directly over the well bore, imposing a horizontal or lateral strain or bend on the marine conductor pipe M, which the flexible connector or connectors P are designed to permit, within limits, without damage to the equipment.

As specifically illustrated in the drawings by way of example, three flexible connectors or joints P are illustrated at closely spaced intervals along the marine riser conductor at its lower portion, to divide the extent of deflection of the conductor pipe between them. It will be appreciated, however, that a single flexible connector P may be used for certain applications. The connector P may be used in various numbers and be disposed at various intervals along the length of the conductor pipe. The flexible connectors are preferably of the ball and socket type illustrated in U.S. Pat. No. 3,433,504, to which attention is invited. The lowermost flexible connector is illustrated in detail in the drawings, and which is specifically devised to not only permit universal movement within limits between the ball and socket portions of the joint, but which permits ready detachment and attachment under remote control between the ball and socket members.

The lowermost flexible connector P comprises generally a ball and socket joint, each connector including a ball or pin section 10 receivable within a companion socket or box section 11. The pin member is secured to an adjacent pipe section 12, or other desired equipment, by any suitable means, as through use of welding material 13. The box 11 may also be suitably secured, as by welding material 14, to a pipe or nipple 15 secured to the blowout preventer J, of which a plurality are usually provided in stacked relation between the wellhead and the marine riser. The pin and box 10, 11 preferably have an inside diameter substantially the same as the inside diameter through the marine riser thereabove, to avoid the presence of any restrictions in the apparatus extending between the floating barge and the well casing. Preferably, the lower inner wall 16 of the pin flares downwardly and outwardly.

The pin 10 includes a head 17 having a spherical external surface 18 fitting within a companion internal spherical surface 19 in the box portion of the connector. The upper or outer end of the box has its inner surface 20 substantially cylindrical and tangent to the inner spherical surface 19 therebelow permit insertion of the spherical head 17 within the spherical socket 11, with the external spherical surface 18 in slidable engagement with the internal spherical surface 19 of the box. When the pin is appropriately assembled within the box, the center of both the external and internal spherical surfaces 18, 19 are the same, permitting the pin and box to pivot with respect to one another.

After the pin 10 has been inserted into the box 11, it is held in assembled position therewithin by a split, inherently expansible lock ring 21 disposed within a groove 22 in the box defined between the upper end 23 of a lower box or socket body portion 24 and the skirt 25 of an upper outer body section 26, which has its lower end threadedly secured to the lower portion of the box. The lock ring 21 has a vertical height substantially equal to the distance between the lower box section end 23 and depending skirt 25, such that the lock ring is slidable laterally within its groove 22 into and from engagement with the spherical surface 18 of the box. The ring has an inner spherical surface 27 conforming to the curvature of the spherical surface 18 of the head. Normally, when free from strain, the split ring 21 will expand outwardly to its largest diameter within its groove 22 and free from projecting within the cylindrical wall 20 of the box, to permit insertion of the pin 10 within the socket 11 and also its removal therefrom. After insertion of the pin within the socket, the ring 21 is contracted into snug engagement with the spherical surface 18 of the pin head. Since the ring engages such surface beyond the diameter of the spherical head 17 normal to the axis of the pin, its contraction will exert a longitudinal force urging the pin 10 inwardly of the box 11 and into snug slidable engagement with the internal spherical surface 19 of the latter.

The ring 21 is contracted from its expanded condition within the circumferential groove by an actuating and retaining annular piston 28, which is slidable in an annular cylinder space 29 defined between the inner and outer box sections 24, 26. The annular piston has a lower skirt portion 30, an upper skirt portion 31, and an intervening head or external flange 32. The upper skirt 31 is slidable along an upper cylinder head 33 provided on the outer box section 26, the lower skirt 30 being slidable along a lower cylinder head 34 below the piston head 32, and which may be formed as a separate sleeve or ring member. As shown, this ring member 34 has an external flange 35 clamped by the lower box section 24 against a downwardly facing shoulder 36 on the outer box section 26 when the box sections are threadedly secured together. Leakage of fluid between the upper skirt 31 and upper head 33 is prevented by a suitable seal ring 37 mounted in the head and slidably and sealingly engaging the periphery of the upper skirt. Similarly, leakage of fluid between the lower skirt 30 and the lower cylinder head 34 is prevented by a suitable seal ring 38 on the lower skirt slidably and sealingly engaging the inner wall of the lower head 34; whereas, leakage of fluid between the piston head 32 and the inner wall 39 of the cylinder is prevented by a suitable piston ring 40 mounted on the piston head slidably and sealingly engaging the cylinder wall. A seal ring 41 is mounted in the box section 26, sealing against the lower head 34 to prevent fluid leakage along its exterior. Fluid under pressure can be conducted from the drilling vessel B through a suitable pipe or hose 42 communicating with an upper port 43 communicating with an upper cylinder space 44 between the piston head 32 and upper cylinder head 33. Similarly, fluid under pressure can be alternatively conducted from the drilling vessel through a suitable hose 45 communicating with a lower port 46 capable of feeding fluid into the lower cylinder space 47 between the piston head 32 and lower cylinder head 34.

The piston 28 may occupy an upper position within the cylinder 29, in which a circumferentially continuous inner recess 48 in the piston is disposed opposite the lock ring 21 (FIG. 3), permitting the latter to expand in a lateral outward direction within its groove and completely outside of the cylindrical wall 20 of the box 11, allowing the pin or ball member 10 to be removed from the box or inserted thereinto. The shifting of the piston 28 downwardly within the cylinder 29 will cause a cam 49, or downwardly and outwardly inclined surface thereon defining the upper end of the recess 48, to engage a companion cam surface 50 provided on the upper corner of the lock ring 21 and cam the lock ring inwardly to engage its inner spherical surface 27 with the external spherical surface 18 of the ball member. The piston 28 is movable downwardly to a degree in which the cam surfaces 49, 50 ride off one another, and an inner cylindrical surface 51 on the piston engages a lower external cylindrical surface 52 of the lock ring, thereby retaining the lock ring solidly in its position against the external spherical surface 18 of the ball, as disclosed in FIG. 2.

The unit P is provided with a stabilizing member consisting essentially of a large diameter "O" section solid rubber ring 53 disposed between an external flange 54 on the pin 10 and an opposed surface 55 on the upper box section 26. The stabilizing ring is also confined between the perimeter 56 of the in below its flange and an opposed inner wall 57 of the box section. The pliant, elastic stabilizer ring arrangement is illustrated generally in the above-identified U.S. Pat. No. 3,433,504. A downwardly and outwardly inclined skirt 58, disclosed in FIG. 4, may be provided on the pin member 10, covering the entry into the box 11, for the purpose of preventing cuttings, or the like, resulting from the drilling operation from dropping into the flexible ball joint.

Leakage of fluid between the ball and socket members 10, 11 is prevented by one or a plurality of seal rings 59 mounted on the ball member and slidably and sealingly engaging the inner spherical surface 19 of the socket or box member.

Figure 2:
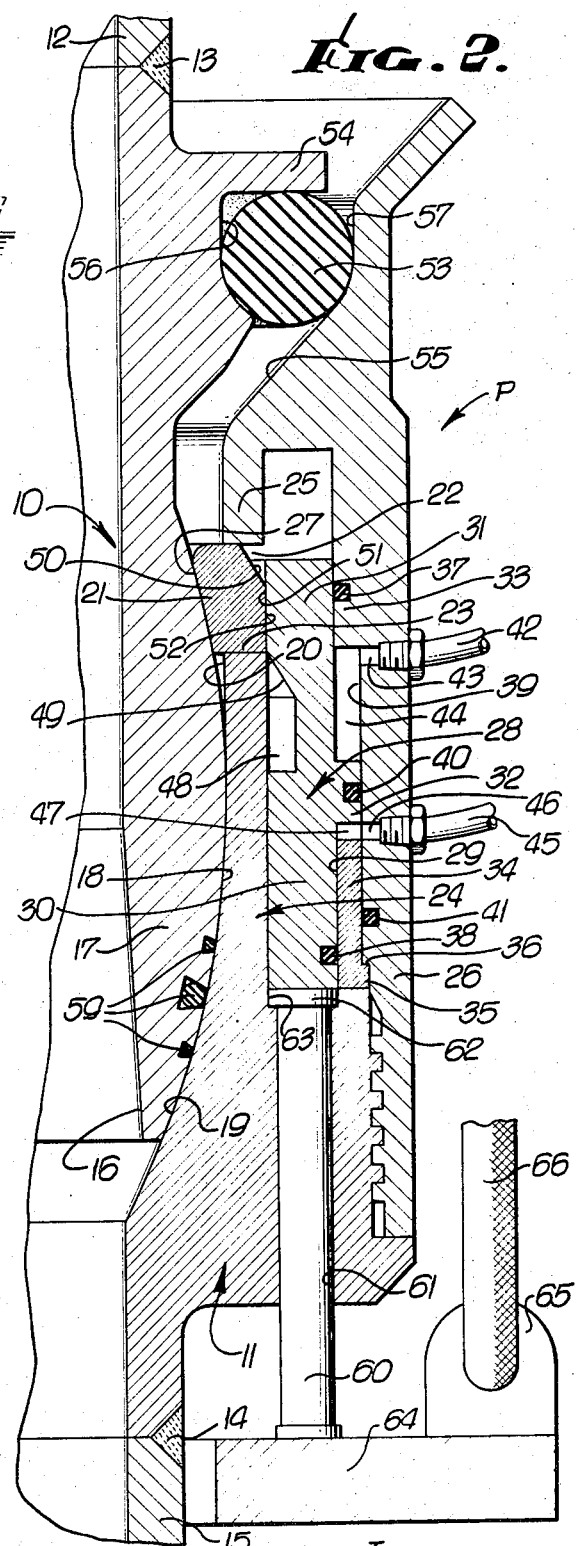
FIG. 2 is a fragmentary vertical section through one of the flexible joints incorporated in the system of FIG. 1.

Normally, the ball and socket joint P will have its parts occupying the relative position illustrated in FIG. 2, with the piston 28 disposed in its lower position within its companion cylinder 29, retaining the lock ring 21 in its inward position. The joint can flex against the resistance offered by the stabilizing member 53 to a limited degree, which is established by the flexibility of the stabilizing member and its contact with the opposed faces or surfaces 54, 55 and 56, 57 on the ball and socket portions of the joint.

In the event it becomes necessary to disconnect the marine riser M from the wellhead or blowout preventer stack J, such as failure of an anchor, or the like, in a storm, fluid under pressure is forced through the hose 45 leading into the lower cylinder space 47 for action upon the piston head 32, forcing the piston 28 upwardly to the extent at which the piston recess or groove 48 is disposed opposite the lock ring 21, the latter inherently expanding into such groove and completely out of the cylindrical confines of the inner wall 20 of the socket (FIG. 3), which then allows the marine riser to be elevated and lift the pin 10 out of the socket 11, thereby effecting disconnection between the marine riser and blowout preventer stack J.

In the event of failure of the fluid or hydraulic system to direct fluid under pressure into the lower cylinder 47, an auxiliary means is provided to effect release of the connector P mechanically. As disclosed, a plurality of circumferentially spaced, longitudinal pins 60 are mounted slidably through longitudinal holes 61 in the lower socket body section 24. These pins have upper heads 62 adapted to rest upon the lower ends of counterbores 63 in the body receiving the heads, the heads being disposed under the piston 28. The lower ends of the pins are secured to a ring 64 surrounding the pipe 15 and having a plurality of circumferentially spaced eye pads 65 extending upwardly therefrom. In the event of failure of the hydraulic system to operate properly, cables 66 are attached to the eye pads 65 and an upward pull taken thereon, which will shift the pins 60 upwardly, causing them to move the piston 28 upwardly within the cylinder 29 to their uppermost position in which the piston groove 48 is opposite the ring 21, allowing the latter to expand outwardly from its holding relation to the portion 10 of the joint, thereby permitting such ball portion to be elevated from the socket 11.

In the event it is desired to reestablish the ball and socket connection P, the ball or pin member 10 is reinserted within the socket 11 and fluid pressure directed through the hose 42 for the purpose of forcing the piston 28 downwardly hydraulically, causing the cam surfaces 49, 50 to coengage and shift the ring 21 inwardly to its fullest extent, the piston moving downwardly to the extent at which its internal cylindrical surface 51 engages the external cylindrical periphery 52 of the ring. The contracting of the ring 21 against the peripheral surface 18 of the ball exerts an inwardly directed axial force on the ball, retaining it firmly within the socket 11, and, at the same time, effecting a further degree of compression of the rubber or rubber-like stabilizing member 53 between its opposed thrust transmitting surfaces on the pin and socket members. Hydraulic pressure may now be relieved, the piston 28 remaining in its downward position. Because of the cylindrical surface coengagement 51, 52 between the piston 28 and lock ring 21, the latter is incapable of being expanded outwardly from its appropriate assembled relation against the spherical surface 19 of the ball member 11.

In the form of invention illustrated in FIGS. 4 and 5, the socket body 11a is provided with an internal circumferential groove 22a receiving the lock ring 21, this groove communicating with a plurality of radial holes 70 extending to the exterior of the socket body. Radially shiftable pins 71 are slidable in these holes, the inner ends of the pins bearing against the exterior of the lock ring 21, the pins having upper inclined cam surfaces 72 thereon adapted to coact with the companion cam surface 49 on the piston 28, which is confined between the exterior of the socket body and an outer housing 26a having a lower flange 73 secured to the body by a plurality of longitudinally extending screws 74. The outer housing 26a and socket body 11 are laterally spaced from one another above the flange 73, providing an annular cylinder space 29 therebetween in which the piston 28 is longitudinally movable. The housing 26a has a lower cylinder head 34a above which the piston head 32 is disposed, there being an upper cylinder head 33a extending within the housing and forming the inner portion of a retainer ring 76 overlying the upper end of the housing 26a, to which the retainer ring is secured by one or a plurality of longitudinally extending screws 77. The upper piston skirt 31 is slidable in the annular space between the upper cylinder head 33a and the upper cylindrical peripheral portion 78 of the socket body 11a; whereas, the lower piston skirt 30 is slidable within the lower annular space provided between the lower cylinder head 34a and the periphery of the socket body 11a.

direction, hose 45 extending from the drilling vessel communicates with a lower port 46 in the housing, communicating with the cylinder space 47 between the piston head 32 and lower cylinder head 34a; whereas, another hose 42 extends from the drilling vessel B to an upper port 43 communicating with the cylinder space 44 between the piston head 32 and the upper cylinder head 33a. Fluid under pressure may be directed selectively into each of the hoses to either shift the piston 28 in a downward direction, in which it engages and forces the pins 71 inwardly to bear the inner spherical surface 27 of the lock ring 21 against the external spherical surface 18 of the ball portion of the joint, or to shift the piston upwardly to enable the lock ring to expand outwardly into the body groove 22a the pins 71 moving into the recess 48 within the piston. For the purpose of retaining the cam surfaces 72 on the pins 71 properly oriented and in their upwardly facing position, the upper side of each pin is provided with a groove or keyway 80 receiving a pin 81 fixed to the socket body.

As in the other form of the invention, a mechanical emergency piston actuator is provided in the form of the rods 60 slidable through holes 61 in the lower end of the outer housing 26a and engaging the piston, the lower ends of these rods 60 being attached to a ring 64 having eye pads 65 attached thereto, to which cables 66 are adapted to be connected when an upward pull is to be taken on the ring 64 and the rods 60 to elevate the piston 28 within its cylinder to its lock ring releasing position.

As illustrated in FIG. 4, the sealing elements 59 on the ball portion of the joint are engageable with a low friction metal inlay 90 in the internal spherical face 19 of the socket body 72a, to facilitate relative movement between the ball and socket members. Similarly, a low friction metal inlay 91 is provided on the spherical exterior 18 of the ball member where it is the by the lock ring 21, to minimize the frictional engagement therebetween.

I claim:

1. In a flexible connector: a box member having an internal spherical surface and a wall merging into said spherical surface to define an upper entry thereinto; a pin member movable downwardly through said upper entry into said box member and having an external spherical surface companion to and slidably engaging said internal spherical surface; said box member having an internal circumferential groove; an expansible and contractable resilient split lock ring means slidable laterally in said groove and having an inner tapered surface engageable with said external spherical surface upon contraction of said ring, the location of engagement being axially upwardly of said internal spherical surface and the maximum diameter of said external spherical surface normal to the axis of said pin member to retain said pin and box members coupled to each other while permitting their tilting with respect to each other; said box member having an annular cylinder therein; an annular piston slidable longitudinally in said cylinder and having a lower piston skirt, an upper piston skirt, and an annular piston head between said skirts and extending laterally outwardly with respect thereto; means providing a slidable sealing relation between said cylinder and said skirts and head to define an upper annular confined cylinder space above said piston head and a lower annular confined cylinder space below said piston head; means for feeding fluid under pressure into said upper cylinder space to shift said piston downwardly in said cylinder along said lock ring means to a holding position surrounding and engaging said lock ring means to retain said lock ring means contracted and engaged with said external spherical surface; means for feeding fluid under pressure into the said lower cylinder space to shift said piston upwardly in said cylinder along said lock ring means to a position permitting expansion of said lock ring means and removal of said pin member from said box member; and operating means extending into said cylinder below said piston in engagement with said lower skirt and having a portion externally of and depending from said cylinder, whereby application of an external upward force to said external portion shifts said piston upwardly in said cylinder to said position permitting expansion of said lock means.

2. In a connector as defined in claim 1; said piston and lock ring means having coengageable cam surfaces for contracting said lock ring means against said external spherical surface upon shifting of said piston downwardly in said cylinder.

3. In a connector: a box member having an internal spherical surface and a wall merging into said spherical surface to define an entry thereinto; a pin member movable through said entry into said box member and having an external spherical surface companion to and slidably engaging said internal spherical surface; said box member having an internal circumferential groove; an expansible and contractable resilient split lock ring means slidable laterally in said groove and having an inner tapered surface engageable with said external spherical surface upon contraction of said ring; the location of engagement being axially outwardly of said internal spherical surface and the maximum diameter of said external spherical surface normal to the axis of said pin member to retain said pin and box members coupled to each other while permitting their tilting with respect to each other; said box member having an annular cylinder therein; an annular piston slidable longitudinally in said cylinder and having a lower piston skirt, an upper piston skirt, and an annular piston head between said skirts and extending laterally outwardly with respect thereto; means providing a slidable sealing relation between said cylinder and said skirts and head to define an upper annular confined cylinder space above said piston head and a lower annular confined cylinder space below said piston head; means for feeding fluid under pressure into one of said cylinder spaces to shift said piston longitudinally in said cylinder in one direction along said lock ring means to a holding position surrounding and engaging said lock ring means to retain said lock ring means contracted and engaged with said external spherical surface; and means for feeding fluid under pressure into the other of said cylinder spaces to shift said piston longitudinally in said cylinder in the opposite direction along said lock ring means to a position permitting expansion of said lock ring means and removal of said pin member from said box member; said lock ring means comprising a lock ring having said tapered surface and circumferentially spaced actuating pins slidable radially in said box member and engaging the outer periphery of said lock ring, said actuating pins having cam surfaces thereon; means engaging said actuating pins to retain the cam surfaces of said actuating pins oriented in a predetermined direction; said piston having a cam surface thereon engageable with said cam surfaces for shifting said actuating pins radially inwardly to contract said lock ring against said external spherical surface upon shifting of said piston longitudinally in said cylinder in said one direction.

4. In a connector: a box member having an internal spherical surface and a wall merging into said spherical surface to define an entry thereinto; a pin member movable through said entry into said box member and having an external spherical surface companion to and slidably engaging said internal spherical surface; said box member having an internal circumferential groove; an expansible and contractable resilient split lock ring means slidable laterally in said groove and having an inner tapered surface engageable with said external spherical surface upon contraction of said ring, the location of engagement being axially outwardly of said internal spherical surface and the maximum diameter of said external spherical surface normal to the axis of said pin member to retain said pin and box members coupled to each other while permitting their tilting with respect to each other; said box member having an annular cylinder therein; an annular piston slidable longitudinally in said cylinder and having a lower piston skirt, an upper piston skirt, and an annular piston head between said skirts and extending laterally outwardly with respect thereto; means providing a slidable sealing relation between said cylinder and said skirts and head to define an upper annular confined cylinder space above said piston head and a lower annular confined cylinder space below said piston head; means for feeding fluid under pressure into one of said cylinder spaces to shift said piston longitudinally in said cylinder in one direction along said lock ring means to a holding position surrounding and engaging said lock ring means to retain said lock ring means contracted and engaged with said external spherical surface; and means for feeding fluid under pressure into the other of said cylinder spaces to shift said piston longitudinally in said cylinder in the opposite direction along said lock ring means to a position permitting expansion of said lock ring means and removal of said pin member from said box member; said piston being shiftable downwardly to said holding position and upwardly to said position permitting expansion of said lock ring means; said piston having a recess in its upper skirt into which said lock ring means expands when said piston is shifted upwardly.

5. In a connector as defined in claim 4; said piston and lock ring means having coengageable cam surfaces for contracting said lock ring means against said external spherical surface upon downward movement of said piston in said cylinder.

6. In a connector as defined in claim 4; and operating means extending into said cylinder below said piston in engagement with said lower skirt and having a portion externally of and depending from said cylinder, whereby application of an external upward force to said external portion shifts said piston upwardly in said cylinder to said position permitting expansion of said lock ring means.

7. In a connector as defined in claim 4; said piston and lock ring means having coengageable cam surfaces for contracting said lock ring means against said external spherical surface upon downward movement of said piston in said cylinder; and operating means extending into said cylinder below said piston in engagement with said lower skirt and having a portion externally of and depending from said cylinder, whereby application of an external upward force to said external portion shifts said piston upwardly in said cylinder to said position permitting expansion of said lock ring means.

* * * * *

FO-1050
(5/69)

UNITED STATES PATENT OFFICE
CERTIFICATE OF CORRECTION

Patent No. __3,695,633__    Dated __October 3, 1972__

Inventor(s) __JAMES W. E. HANES__

It is certified that error appears in the above-identified patent and that said Letters Patent are hereby corrected as shown below:

Column 4, line 48, "in" should read --pin--.

Column 6, line 31, cancel "direction" and substitute --A--.
         line 66, cancel "72a" and substitute --11a--.

Column 7, line 1, cancel "the" (second occurrence) and substitute --contacted--.

Signed and sealed this 24th day of April 1973.

(SEAL)
Attest:

EDWARD M. FLETCHER, JR.                ROBERT GOTTSCHALK
Attesting Officer                      Commissioner of Patents